(12) United States Patent
Suehiro et al.

(10) Patent No.: US 9,162,519 B2
(45) Date of Patent: Oct. 20, 2015

(54) DECORATIVE SURFACE STRUCTURE OF SYNTHETIC RESIN MOLDED ARTICLE, METHOD FOR PRODUCING THE SAME AND AUTOMOBILE INTERIOR PART

(75) Inventors: Takuya Suehiro, Fukui (JP); Akira Yamaguchi, Fukui (JP); Harukazu Kubota, Fukui (JP)

(73) Assignee: SEIREN CO., LTD., Fukui-shi (JP)

(*) Notice: Subject to any disclaimer, the term of this patent is extended or adjusted under 35 U.S.C. 154(b) by 129 days.

(21) Appl. No.: 13/055,820

(22) PCT Filed: Jul. 27, 2009

(86) PCT No.: PCT/JP2009/063338
§ 371 (c)(1),
(2), (4) Date: Apr. 4, 2011

(87) PCT Pub. No.: WO2010/013667
PCT Pub. Date: Feb. 4, 2010

(65) Prior Publication Data
US 2011/0177303 A1    Jul. 21, 2011

(30) Foreign Application Priority Data

Jul. 31, 2008  (JP) ................................ 2008-198818
Aug. 21, 2008  (JP) ................................ 2008-213016

(51) Int. Cl.
*B32B 3/10*   (2006.01)
*C08F 2/48*   (2006.01)
*B05D 3/02*   (2006.01)
(Continued)

(52) U.S. Cl.
CPC ... *B44C 3/02* (2013.01); *B32B 3/10* (2013.01); *B05D 5/02* (2013.01); *B05D 7/56* (2013.01); *Y10T 428/24802* (2015.01)

(58) Field of Classification Search
None
See application file for complete search history.

(56) References Cited

U.S. PATENT DOCUMENTS 6,623,660 B1* 9/2003 Kimura .................... 252/299.01
2003/0113520 A1* 6/2003 Takahashi et al. ............ 428/201
(Continued)

FOREIGN PATENT DOCUMENTS

JP    61-71870    4/1986
JP    1-304264    12/1989
(Continued)

OTHER PUBLICATIONS

Machine Translation of JP 61-071870.*
(Continued)

*Primary Examiner* — Gerard Higgins
*Assistant Examiner* — Sathavaram I Reddy
(74) *Attorney, Agent, or Firm* — Kratz, Quintos & Hanson, LLP

(57) ABSTRACT

Provided are a decorative surface structure of a synthetic resin molded article which has excellent wear resistance, design and texture, a method for producing the same, and a synthetic resin molded decorative article. Specifically provided are a decorative surface structure of an automobile interior part, which is capable of various design representations having an excellent three-dimensional appearance, while ensuring anti-dazzling property, and does not spoil glossy finish, a method for producing the same, and an automobile interior part. The decorative surface structure is comprised of a base coating region formed on a surface of a synthetic resin molded article by a coating layer and one or more convex portion formed on the base coating member.

6 Claims, 12 Drawing Sheets

(51) Int. Cl.
    *B44C 3/02*     (2006.01)
    *B05D 5/02*     (2006.01)
    *B05D 7/00*     (2006.01)

(56) References Cited

U.S. PATENT DOCUMENTS

| | | | |
|---|---|---|---|
| 2006/0043633 A1* | 3/2006 | Dempsey et al. | 264/163 |
| 2008/0182041 A1* | 7/2008 | Sekine et al. | 428/29 |
| 2008/0186585 A1* | 8/2008 | Mino et al. | 359/620 |
| 2009/0015548 A1* | 1/2009 | Tazaki et al. | 345/156 |

FOREIGN PATENT DOCUMENTS

| | | |
|---|---|---|
| JP | 2005-66530 A1 | 3/2005 |
| JP | 2005-205670 A1 | 8/2005 |
| JP | 2006-35184 A1 | 2/2006 |
| JP | 2006-327074 A1 | 12/2006 |
| JP | 2007-249028 A | 9/2007 |
| JP | 2008-169242 A1 | 7/2008 |
| JP | 2008-213280 A1 | 9/2008 |
| JP | 2008-264729 A1 | 11/2008 |
| WO | WO 2005/005560 A1 | 1/2005 |
| WO | WO 2006038648 A1 * | 4/2006 |

OTHER PUBLICATIONS

Machine Translation of JP 2007-249028.*
International Search Report for International Application No. PCT/JP2009/063338 dated Oct. 27, 2009.
Japanese Office Action issued Jul. 15, 2014 in counterpart application No. 2010-522705.

* cited by examiner

L

DECORATIVE SURFACE STRUCTURE OF SYNTHETIC RESIN MOLDED ARTICLE, METHOD FOR PRODUCING THE SAME AND AUTOMOBILE INTERIOR PART

TECHNICAL FIELD

The present invention relates a decorative surface structure of a synthetic resin molded article. More particularly, the present invention relates to a decorative surface structure of a synthetic resin molded article which is comprised of a base coating region formed on the surface of the synthetic resin molded article by a coating layer and one or more convex portions formed on the base coating region and which has excellent wear resistance, design, and texture and is capable of various design representations having an excellent three-dimensional appearance and gloss property, while having antidazzling property, and to a method for producing the same and an automobile interior part.

BACKGROUND ART

In recent years, a synthetic resin molded article with light weight and excellent impact resistance is used in various fields such as computer housings, light electrical components such as a cellular phone, and interior materials, and also is used for an automobile interior part. Many automobile interior parts such as instrument panels, center consoles and door trims are manufactured by initially, processing various synthetic resins to molded articles having desired shapes by an injection molding machine and the like, and then applying a color base coat containing a color material on the surface of the molded article to form a coating layer. If necessary, a plurality of coating layers are formed on the surface of the molded article, for example, by conducting a clear coating for improvement of weather resistance and wear resistance. Through these steps, the molded article having excellent weather resistance, wear resistance and decorative property are provided in the market.

However, as the synthetic resin molded article manufactured by such a method are treated by base coating or clear coating, the coating surface is eventually flat and even. Unfortunately, sufficient visual variations are not obtained on the surface of the synthetic resin molded article, resulting in poor designs.

When the synthetic resin molded article is used as an automobile interior part, the molded article on which an emboss pattern composed of fine concavo-convex shapes is molded to provide various design variations is widely utilized. For example, the patent document 1 discloses a method for providing a smooth texture by forming fine concavo-convex shapes on the surface of automobile interior parts and the like.

When base coating is conducted on a molded article with fine concavo-convex shapes, since the surface has different levels of heights in convex regions and concave regions, coatings flow into the concave regions, and thus it is very hard to make a coating thickness of convex regions and concave regions uniform. As a result, irregular-coating and irregular-coloring are formed.

Automobile interior parts are required to have functions which provide a comfortable internal environment for passengers. That is, the interior parts are required to have attractive appearances; high-quality design representations such as texture and color tone highlighted by providing a three-dimensional pattern and gloss; and good balance with designs of other interior parts.

Many of automobile interior parts include injection-molded articles derived from PP and ABS resin as substrates, and therefore, a high-quality appearance is created in the internal environment of an automobile by putting a high quality-looking material on the surface of the substrate. In recent years, since a trend of cost reduction is strongly increased, a low cost approach in which coating is directly conducted to molded articles of interior parts is often utilized. Lately, there are increasing demands for high-quality and individual decoration in these interior parts, and in many cases, the surfaces of interior parts are provided with decorations and covered with protective coating, and the surfaces of interior parts are treated by coating, transcribing by hydraulic pressure, decorating, and then glossy finish on the top surface layer.

Although various drawing patterns can be represented by coating and transcribing, they are only flat patterns. It is possible to represent designs with excellent three-dimensional patterns and more high-quality by combining drawing patterns with three-dimensional patterns. One example of these representations includes a method in combination with a step of applying fine concave and convex shapes by a metallic mold and a step of applying drawing patterns by transcription. In this method, matching of the concave and convex shapes to the drawing pattern is very difficult and the representation of concave and convex shapes is also very limited. As a result, three-dimensional patterns corresponding to the drawing patterns to be applied can not be obtained, and the design representations are largely limited.

Other example of factors for maintaining comfort of the internal environment of automobile includes prevention of discomfort for passengers such as noticeable stains caused by sebum from fingerprints on interior parts.

On the other hand, automobile interior parts are required to have functions such as safety and durability during driving in addition to providing a comfortable internal environment for passengers. To ensure safety during driving, antidazzling functions, i.e. functions to protect driver's eyes from reflective light in which incident light from the outside such as sunlight is reflected on the surface of the interior part or to prevent driving troubles with narrow range of view by entering reflective light into a front window are required. In durability, interior parts are required to be free from wearing and degradation with long-time use.

When the surface of the interior part is treated by glossy finish to create high-quality in consideration of comfort of internal environment, antidazzling function is impaired and a problem with safety is caused. Therefore, the surface of the interior part, which easily comes into driver's sight, such as an instrument panel is commonly ensured to have antidazzling property by matting on its whole or partial surface or forming fine concave and convex shapes on a clear coating layer to scatter light for matting. In a method for forming fine concave and convex shapes, patent document 2 discloses a technique in which fine concave and convex patterns are formed on a coating layer formed on the surface of the automobile interior part by indentation molding.

Although antidazzling property is ensured in the above method, design representations with excellent three-dimensional appearances and gloss appearances are limited. In a coating layer treated with a mat coat which is used to ensure antidazzling property, the mat effects are decreased gradually and a problem with durability is caused. As described in the patent document 2, in the case of fine concave and convex shapes for matting, matting only a desired part is difficult in terms of matching with a pattern. Thus, there is a problem that matting corresponding to decorative representations such as color pattern and drawing pattern cannot be conducted.

PRIOR ART DOCUMENT

Patent Document

Patent Document 1: JP2007-22000A
Patent Document 2: JP2001-276725A

DISCLOSURE OF INVENTION

Problems to be Solved by the Invention

The present invention was made in consideration of the above-mentioned problems, and the object of the present invention is to provide a decorative surface structure of a synthetic resin molded article, which has excellent wear resistance, design and texture, a method for producing the same and a synthetic resin molded article.

Further object of the present invention is to provide a decorative surface structure of a synthetic resin molded article, which is capable of various design representations having an excellent three-dimensional appearance, while ensuring antidazzling property, and does not spoil glossy finish, a method for producing the same and an automobile interior part.

Means to Solve the Problems

The decorative surface structure of a synthetic resin molded article according to the first aspect of the present invention is a decorative surface structure which is composed of a base coating region formed on a surface of the synthetic resin molded article by a coating layer and one or more convex portions formed on the base coating region.

The convex portions are cured portions of a decorative ink containing a resin composition and the area covered by the convex portions per unit area is preferably 20 to 60%.

In the convex portions, preferably, the short diameter is 0.2 to 2.0 mm and the height from the surface of a base coating region is 20 to 200 μm.

Preferably, the decorative ink has substantially hemisphere shape and its diameter is 0.2 to 1.0 mm.

A height of the convex portion from the surface of base coating portion is preferably 2 to 20 times the thickness of the base coating portion.

The decorative ink preferably contains a color material.

The decorative ink preferably comprises an ultraviolet (UV) curing ink.

The method for producing a decorative surface structure of a synthetic resin molded article according to the second aspect of the present invention comprises steps of
(a) forming a base coating region by applying a base coat on the outer surface of the synthetic resin molded article,
(b) applying an UV curing ink by ink jet method on the base coating region obtained in the step (a), wherein the UV curing ink is applied in amount of 20 to 100 g/m$^2$ so that one droplet of the UV curing ink is 60 to 140 pg,
(c) curing the UV curing ink applied in the step (b) with ultraviolet irradiation and
(d) repeating the steps (b) and (c) 2 to 8 times to provide a decorative surface structure, wherein the height of the convex portion is 2 to 20 times the thickness of the base coating region.

The method for producing a decorative surface structure of a synthetic resin molded article according to the third aspect of the present invention comprises steps of
mixing a reactive monomer and/or a reactive oligomer to produce a decorative ink,
applying the decorative ink on the base coating region which is formed on the outer surface of a substrate by an ink jet method, and curing the decorative ink applied on the base coating region.

The automobile interior part according to the fourth aspect of the present invention has the decorative surface structure formed on its outer surface.

Effect of the Invention

According to the present invention, since the convex portion forming a three-dimensional pattern is formed on a base coating region, formation of a concavo-convex pattern on synthetic resin molded articles is not needed and a synthetic resin molded article with a flat surface can be used. Therefore, the base coating region can be applied on a synthetic resin molded article with a flat surface, and uniform coating can be realized without irregular coating. When the base coating region is applied with a color base coat, irregularly color is not generated.

The convex portion of the decorative surface structure has the surface pressure being higher than that of the concave portion of the base coating region and therefore, high wear resistance is required. According to the present invention, the convex portion is formed using UV curing ink with excellent wear resistance, whereby the convex portion and a decorative surface structure have excellent wear resistance. Furthermore, the convex portion formed on the base coating region is formed by over-applying of UV curing ink and therefore, wear resistance of the decorative surface structure is further improved.

According to the decorative surface structure of the present invention, since an area in which the convex portion is formed can be optionally produced by an image processing software, various three-dimensional patterns are possibly formed on synthetic resin molded articles with the same shapes as well as various kinds of synthetic resin molded articles. Furthermore, an optional amount of ink droplet required can be applied at an optional part on the base coating region based on digital data and therefore, a size of a single convex portion, height of the convex portions and an area of the convex portions to be applied can optionally be regulated or controlled to form a decorative surface structure with elaborated and highly qualified design representations and excellent texture.

Since size and applied amount of a plurality of convex portions by which the decorative surface structure is composed can be optionally controlled, a high-qualified, three-dimensional and decorative pattern can be formed on the surface of an automobile interior part. A three-dimensional pattern matched with a drawing pattern formed on the surface provides excellent three-dimensional appearance to the decorative surface structure. Further, the convex portion having a curved surface provides excellent texture on the surface of the interior part. Even in the case where glossy finish is conducted on the surface of the interior part, the convex portion reflects diffusely incident light to protect driver's eyes from directly entering light and to prevent entering of the reflected light in a front window. Thus high antidazzling property is ensured. The decorative surface structure has a few flat portions and soiled sebum from fingerprints or the like is not obviously found.

When the convex portion includes a color material, the decorative surface structure of the present invention can represent a colorful drawing pattern. Shading the color material allows to represent variations of color tone which cannot be obtained in a flat pattern, and contrasts of light beyond that actually formed by the three-dimensional pattern. The convex portion including a gloss resin, even though a base coating does not have gloss property, can represent a partial gloss.

In the decorative surface structure of the present invention, use of ink jet method allows the convex portion to be fine, and three-dimensional patterns having various and elaborated designs can be formed quickly and accurately only by inputting information of designs digitalized previously. Since the amount of decorative ink to be applied can be optionally controlled and the ink can be applied on an optional region, the decorative surface structure having both high-quality design and antidazzling property can be used in the ranges from narrow to broad.

Since the convex portion includes a synthetic resin, the decorative surface structure of the present invention is hardly subject to deterioration due to wear in long-term use, thereby assuring reduced deterioration of three-dimensional appearance, gloss property and antidazzling property in long-term use and providing excellent durability.

Figure 1:
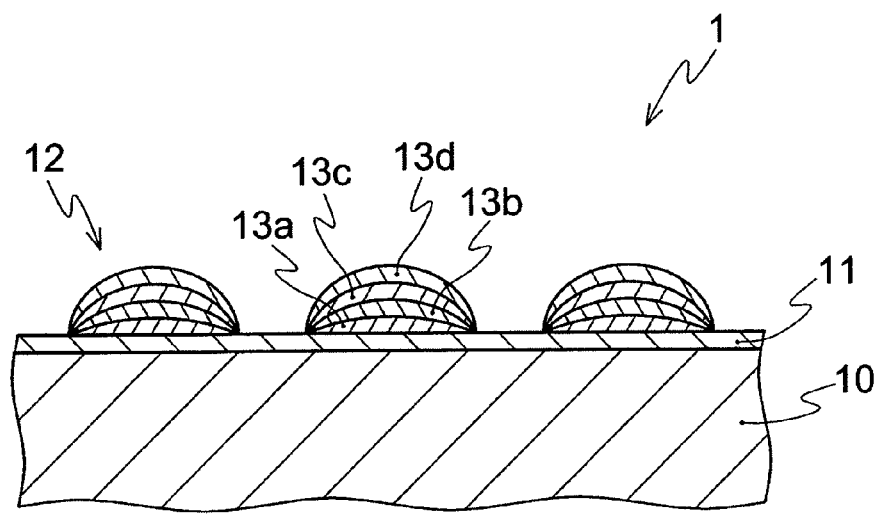
FIG. 1 is a cross sectional view of the first embodiment of the decorative surface structure of the present invention.

EMBODIMENT FOR CARRYING OUT THE INVENTION (Synthetic Resin Molded Articles)

The decorative surface structure of the present invention is formed on the outer surface of a substrate of the synthetic resin molded article. Examples of synthetic resin molded articles include computer housings, light electrical components such as a cellular phone, and interior materials, but are not limited thereto. Preferable examples of them include an automobile interior part which is required to have excellent design and texture in addition to light weight and excellent wear resistance. Examples of automobile interior parts include an instrument panel, a center console, door trim and the like.

Plastic materials such as acrylonitrile-butadiene-styrene (ABS), polyethylene (PE), polypropylene (PP), polystyrene (PS), polyvinyl chloride (PVC), polycarbonate (PC), polysulfone (PSF), polyphenylene oxide (PPO) and polyphenylene sulfide (PPS), and thermoplastic elastomers based on styrene, olefin, vinyl chloride, urethane, ester, amide, chlorinated polyethylene and 1,2-polybutadiene molded by known molding methods such as injection molding, extrusion molding and blow molding can be used as materials of the substrate.

In the injection molding, for example, the materials are molded by melting resin materials at 180 to 220° C. and injecting to a molded concave portion of a metallic mold maintained at 5 to 50° C. In the molded articles, an organic filler, a plasticizer, an antioxidant, a hydrolysis inhibitor, an ultraviolet absorber, a thermal stabilizer, a flame retardant and the like can be mixed appropriately according to purpose of respective applications.

(Base Coating Region)

The decorative surface structure is formed on the outer surface of a substrate of the synthetic resin molded article molded as described above, and includes a base coating region formed on the surface of the synthetic resin molded article by a coating layer and a plurality of convex portions formed on the base coating region. In the present invention, since the convex portion forming a three-dimensional pattern is formed on the base coating region, the synthetic resin molded article itself is not needed to be formed into a concavo-convex pattern, and can have a flat surface. Thus, a base coat can be applied on the flat surface of the substrate, thereby coating evenly without irregular coating.

In the case where the decorative surface structure is used in the automobile interior part, it is composed of a base coating region which is formed on the outer surface of a substrate of the automobile interior part by a coating layer, and a plurality of convex portions formed on the base coating region. The base coating is not particularly limited, but may be any of coatings having either gloss property or non-gloss property. To improve antidazzling effect which the decorative surface structure has, examples of coatings include those having gloss property such as metallic coating including metallic pieces and metallic oxide, pearl coating and clear coating for protection of the surface, and may also include general coatings comprising pigments, matt coating and clear coating for protection in which a woodgrain pattern or the like is transcribed by hydraulic pressure, and those may be used in combination. A method for coating is not particularly limited and spray and the like can be used for coating.

The base coating is not particularly limited, and examples of coats include general coatings comprising common pigments, matt coating and clear coating for protection in which a woodgrain pattern or the like is transcribed by hydraulic pressure, and may also include coatings having gloss property such as metallic coating including metallic pieces and metallic oxide, pearl coating and clear coating for protection of the surface, and those may be used in combination. At least one lamination boundary surface exists between the synthetic resin molded article and the base coating region, and when more than one coats are used as a base coating, more than one lamination boundary surfaces exist between the synthetic resin molded article and the surface of the base coating region. According to the embodiment of the present invention, since a thermoplastic elastomer to be used on the synthetic resin molded article has poor light resistance, heat resistance and wear resistance, existence of the coating region has a role to protect the synthetic resin molded article. Furthermore, even in the case of only one molded part, there is an advantage of being able to decorate optionally by changing a coat for a colored base coating region.

In the base coat, resin compositions such as polyurethane resin, acrylic resin, silicone resin, epoxy resin, alkyd resin and amino alkyd resin based coating compositions can be contained. Of them, a polyurethane coat being excellent in solvent resistance, adhesiveness, hardness, strength of coating layer, weather resistance and chemical resistance is preferred, and a 2-component polyurethane coat comprising acryl-based polyol with 5 to 100 mg KOH of hydroxyl value and polyisocyanate compound, which has high weather resistance, solvent resistance and adhesiveness, are more preferred. The hydroxyl value of the coat is preferably not less than 5 mg KOH in terms of high strength of coating layer and high wear resistance, and is preferably not more than 100 mg KOH in terms of excellent adhesiveness with the convex portion formed on the base coating region.

The base coating region is preferably colored (i.e. colored base coating region). The colored base coating region can be formed on the flat surface of the synthetic resin molded article by a coating layer without irregular colors. Organic pigments such as azo-based pigments, phthalocyanine-based pigments, indigo-based pigments, perinone-based pigments, perylene-based pigments, phthalon-based pigments, dioxane-based pigments, quinacridone-based pigments, isoindolinone-based pigments, and metallic complex pigments; inorganic pigments such as iron oxide yellow, iron oxide red, carbon black, and titanium dioxide; extender pigments such as talc, calcium carbonate, precipitated barium sulfate, and silica; mica-based pigments such as white mica, color mica and interference mica; aluminum flake pigments, iron oxide-coated aluminum flake pigments, metal oxide-coated silica flake pigments, graphite pigments, metallic titanium flake pigments, stainless steel flake pigments, iron oxide flake pigments, metal-plated glass flake pigments, metallic oxide-plated glass flake pigments, hologram pigments and the like can be used as a color material constituting color base coats.

The base coating can be used by diluting with different organic solvents in order to have kinematic viscosity suitable for an applying apparatus. If necessary, components such as a thickener, an anti-settling agent, an anti-foam agent, an anti-static agent, an anti-oxidant, a curing catalyst, an antidazzling agent, a leveling agent, a lubricating agent and an ultraviolet absorber may be added.

A 10 to 30 µm thick cured layer can be formed by curing with heat at 50 to 100° C. after forming a layer of the base coating region. The thickness of the cured layer is preferably not less than 10 µm in that a synthetic resin molded article is covered completely to prevent obvious irregular coatings and coating strength is increased to improve wear resistance, and is preferably not more than 30 µm in that occurrence of defects of coating appearance such as poor drying efficiency, orange peel and pinhole is prevented.

(Convex Portion)

As shown in FIG. 1, a convex portion 12 is formed by applying and curing UV curing ink on the base coating region 11 formed on the surface of the synthetic resin molded article 10 by a coating layer. The convex portion 12 is preferably formed so that a first ink layer 13a is formed by applying and curing UV curing ink and a second ink layer 13b is formed by over-applying and curing UV curing ink on the first ink layer, thereby the height of the convex portion from the surface of the base coating region 11 being 2 to 20 times the thickness of the base coating region 11. In this way, wear resistance of the convex portion 12 and the decorative surface structure 1 are improved. The height is preferably 2 times the thickness of the base coating region 11 so as to obtain three-dimensional appearance visually and tactually, more preferably not less than 6 times so as to obtain good three-dimensional appearance tactually. On the other hand, in the case where the height is over 20 times the thickness of the base coating region 11, cycles repeating steps of applying and curing UV curing ink are increased and the productivity and wear resistance tend to be decreased. In view of the productivity and wear resistance, the height is preferably not more than 20 times the thickness of the base coating region 11, more preferably not more than 10 times.

In the case where a shape from top view of the convex portion 12 has long and short diameters, a shortest diameter of the convex portion 12 is a short diameter L. In the case where the convex portion 12 has a substantially hemisphere shape or a circular shape from the top view, an average value of short and long diameters of the circular shape is a diameter L. To observe gloss which the convex portion 12 has, the short diameter L of the convex portion 12 is preferably not less than 0.2 mm, more preferably not less than 0.23 mm, most preferably not less than 0.25 mm. In terms of providing diffused reflection effect on the surface of the automobile interior part and ensuring antidazzling property, the short diameter L of the convex portion 12 is preferably not more than 2.0 mm, more preferably not more than 1.0 mm, most preferably not more than 0.5 mm.

To obtain three-dimensional appearance visually and tactually, the height of the convex portion 12 from the surface of the base coating region 11 is preferably not less than 20 µm, more preferably not less than 40 µm, most preferably not less than 60 µm. The three-dimensional effect obtained by the height is limited, and the height needs not to be higher than required in consideration of the production cost. Additionally, in production, the strength trends to be decreased as the height is too high. Thus, the height is preferably not more than 200 µm, more preferably not more than 150 µm, most preferably not more than 120 µm in terms of durability in use and not to be caught by nails or the like.

The decorative surface structure of the present invention includes a plurality of convex portions 12 having a curved surface. The convex portion 12 is formed on the base coating region 11 formed on the outer surface of a substrate. The convex portion 12 can provide excellent three-dimensional appearance and texture of the surface of the interior part, and protect driver's eyes from direct reflection of incident light and prevent entering reflected light on a front window by diffusing the incident light on the surface of the interior part. Thus antidazzling property of the decorative surface structure is maintained. Furthermore, flat portions on the surface of the automobile interior part are reduced and soiled sebum from fingerprints and the like is not obviously found by the convex portion.

Figure 2:
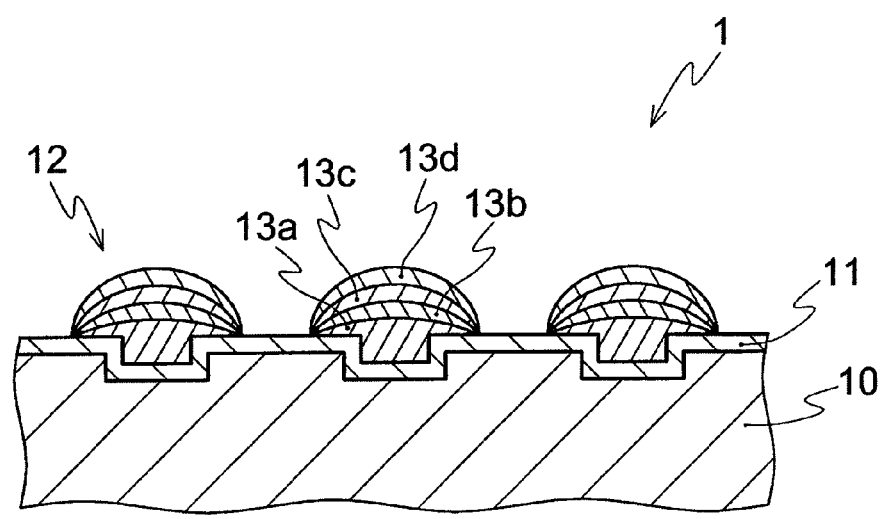
FIG. 2 is a cross sectional view of the second embodiment of the decorative surface structure of the present invention.
Figure 3:
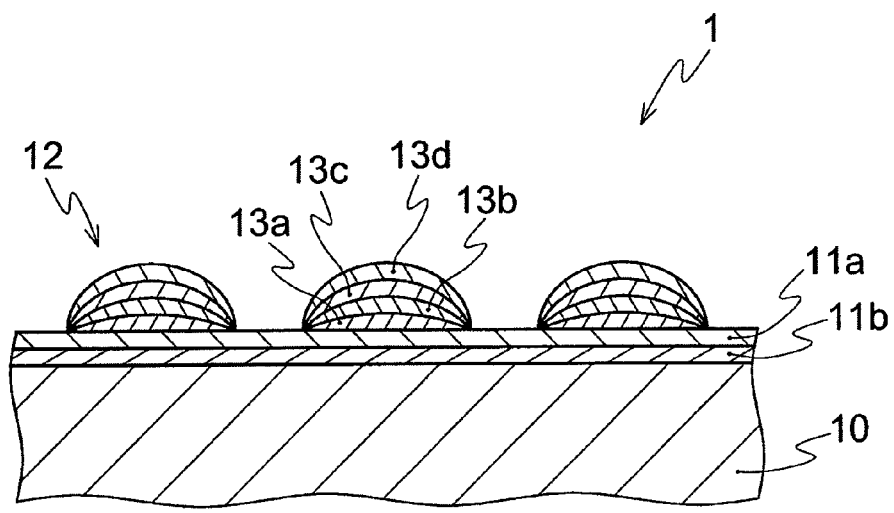
FIG. 3 is a cross sectional view of the third embodiment of the decorative surface structure of the present invention.
Figure 4:
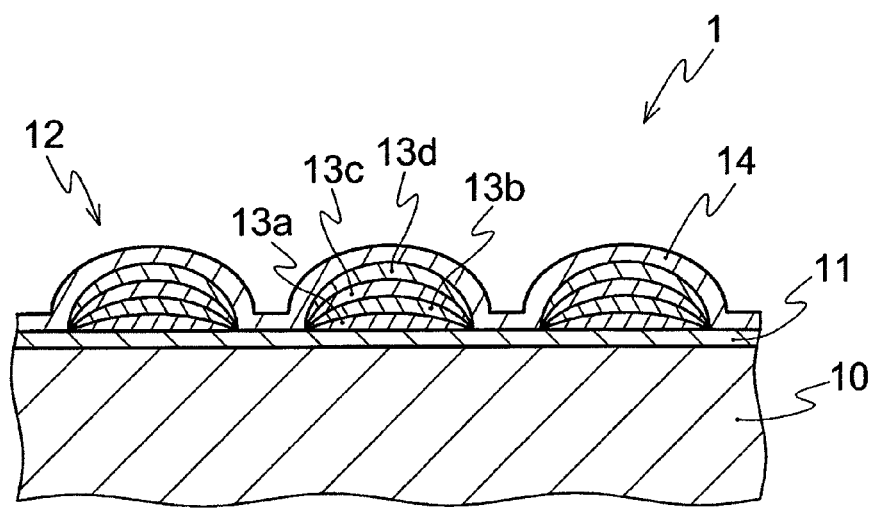
FIG. 4 is a cross sectional view of the fourth embodiment of the decorative surface structure of the present invention.
Figure 5:
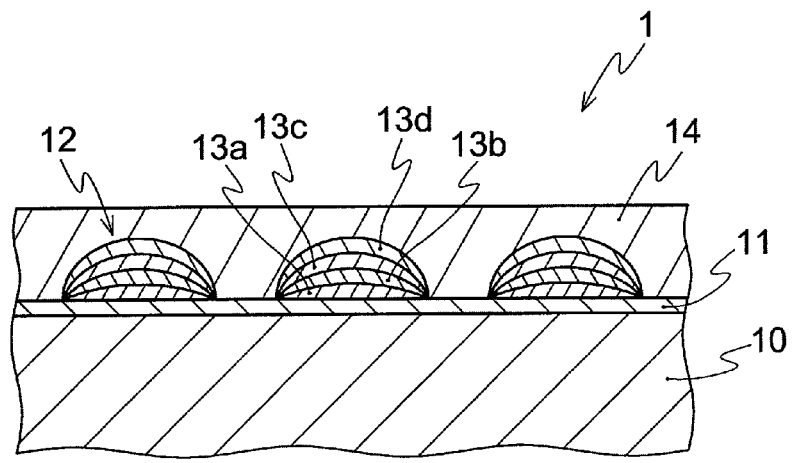
FIG. 5 is a cross sectional view of the fifth embodiment of the decorative surface structure of the present invention.

As shown in FIG. 2, the convex portion 12 can be formed on the top surface of a concave portion formed on the surface of the synthetic resin molded article 10 through the base coating region 11. Since this allows to apply and cure the first ink layer 13a on the concave portion and to adhere the base coating region 11 strongly with the first ink layer 13a, detachment of the convex portion 12 can be prevented strongly. The decorative surface structure 1 of this embodiment, as shown in FIG. 3, may be a decorative surface structure 1 having two layers of the base coating region 11 (11a, 11b), and as shown in FIG. 4 and FIG. 5, may be also a decorative surface structure 1 in which a finish coating region 14 is formed (applied) by a coating layer on the base coating region 11 and the convex portion 12.

Figure 6:
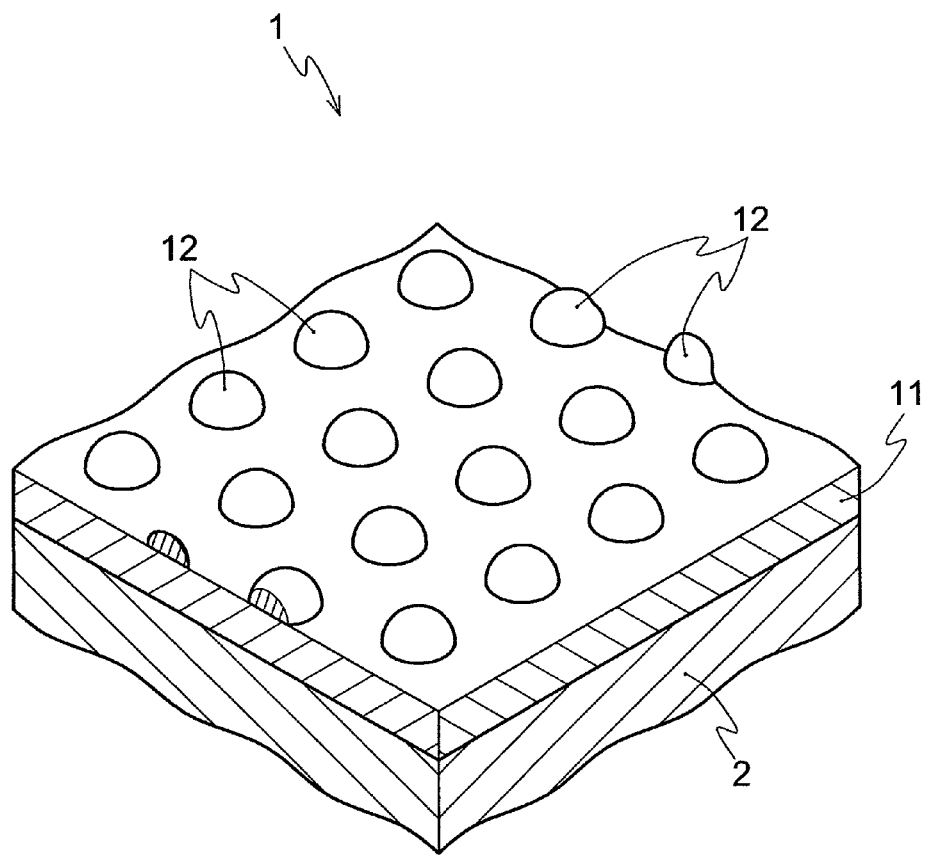
FIG. 6 is a cross sectional view of the sixth embodiment of the decorative surface structure of the present invention.
Figure 7A:
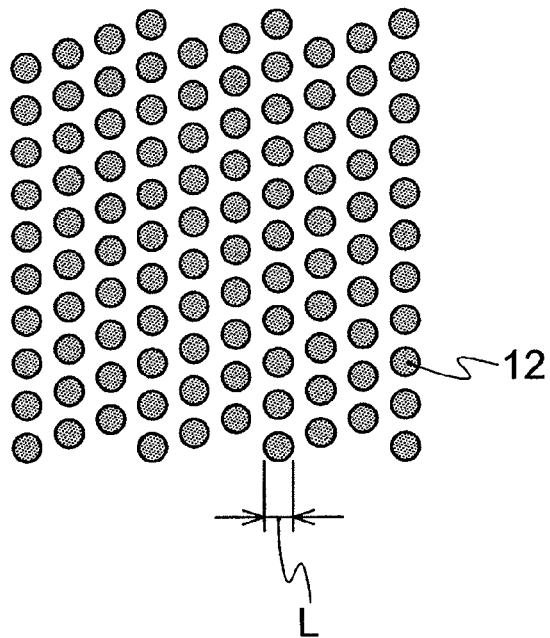
FIG. 7a is a top view of the convex portion of the decorative surface structure in the sixth embodiment of the present invention.
Figure 7B:
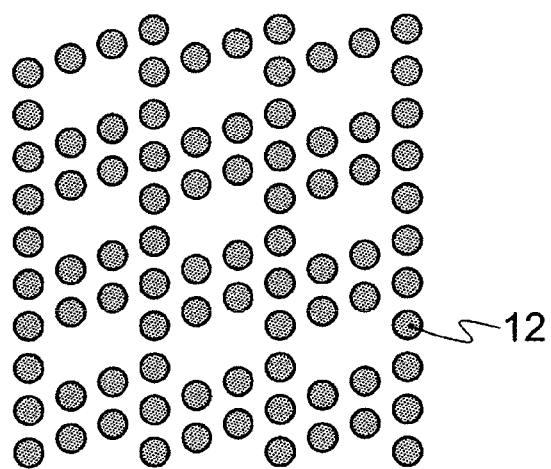
FIG. 7b is a top view of modification of (a).
Figure 7C:
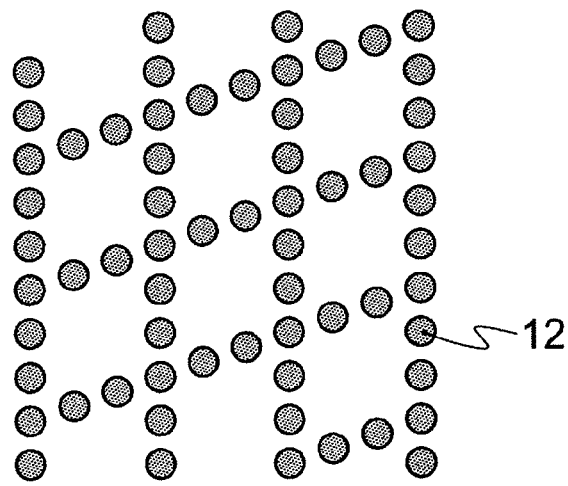
FIG. 7c is a top view of modification of (a).
Figure 7D:
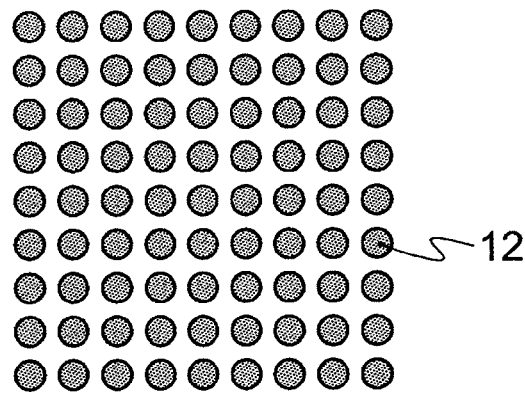
FIG. 7d is a top view of modification of (a).
Figure 7E:
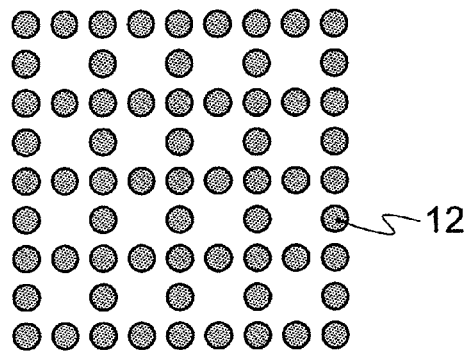
FIG. 7e is a top view of modification of (a).
Figure 7F:
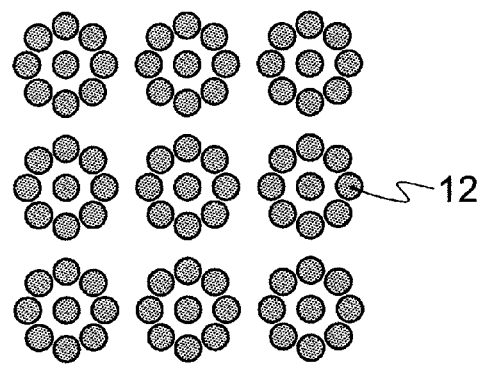
FIG. 7f is a top view of modification of (a).
Figure 7G:
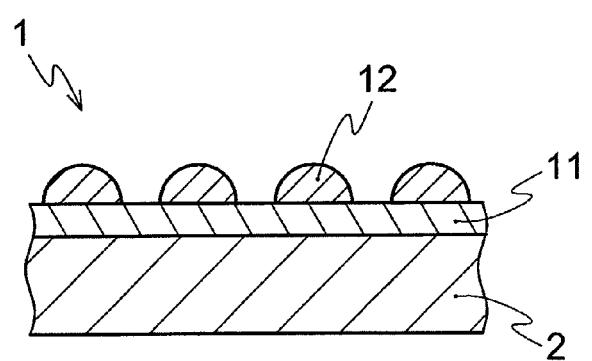
FIG. 7g is a cross sectional view of (a).
Figure 8A:
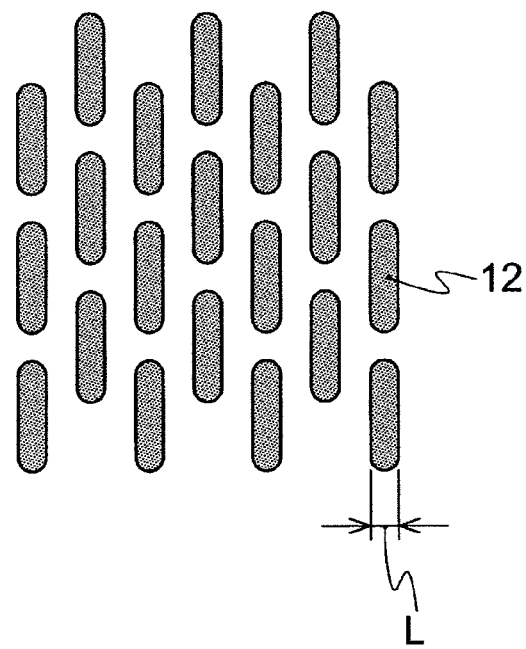
FIG. 8a is a top view of the convex portion of the decorative surface structure in the seventh embodiment of the present invention.
Figure 8B:
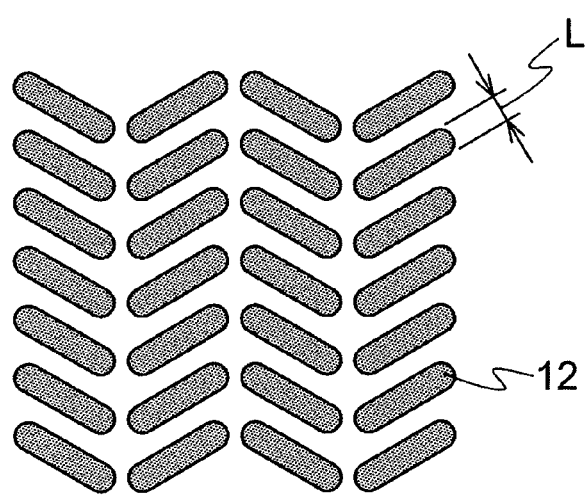
FIG. 8b is a top view of modification of (a).
Figure 8C:
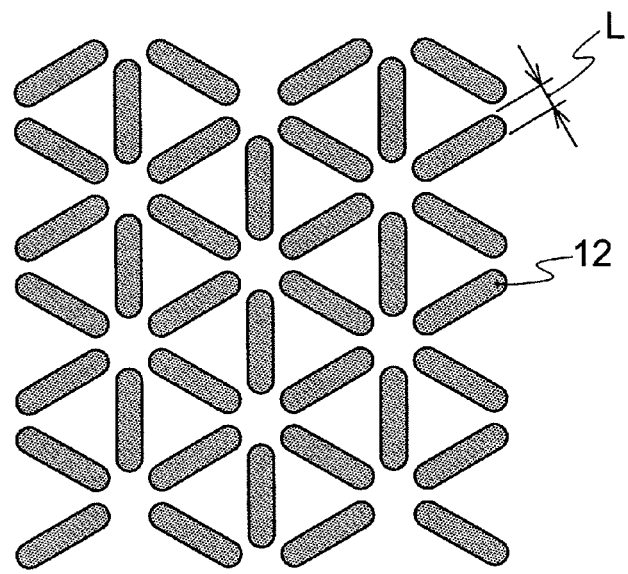
FIG. 8c is a top view of modification of (a).
Figure 8D:
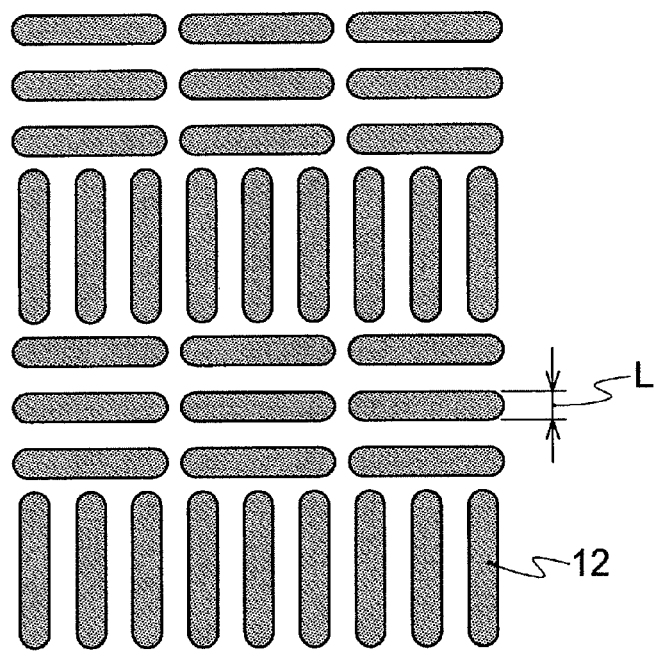
FIG. 8d is a top view of modification of (a).
Figure 8E:
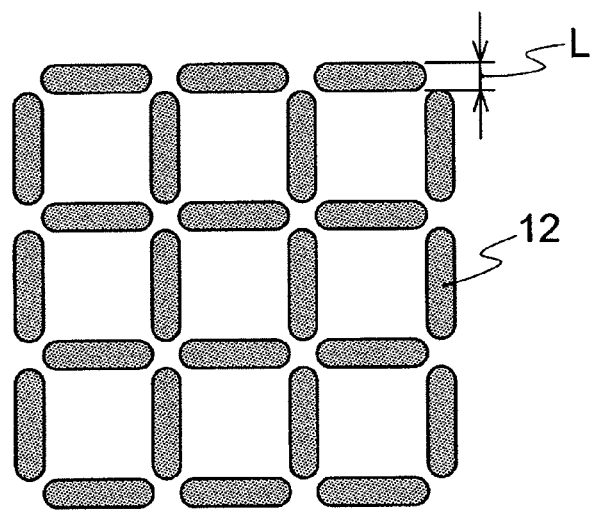
FIG. 8e is a top view of modification of (a).
Figure 8F:
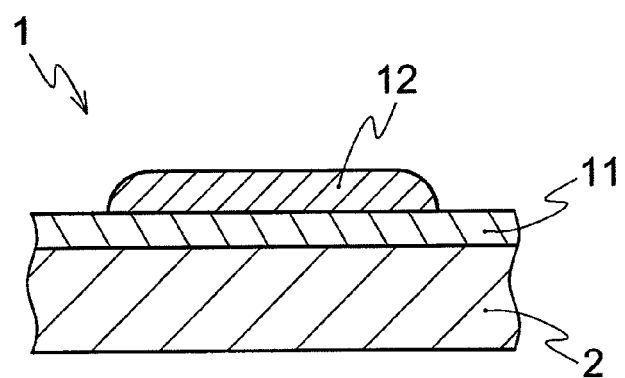
FIG. 8f is a cross sectional view of (a).

Although the convex portion 12 can have various shapes, it is required to have excellent design representation, three-dimensional appearance and texture and to ensure antidazzling property. To obtain these functions, the convex portion 12 is most preferably a substantially hemisphere in shape. The decorative surface structure 1 in which a plurality of convex portions 12 with a substantially hemisphere shape is formed is shown in FIG. 6. As shown in FIG. 6, the convex portion 12 with a substantially hemisphere shape is formed by applying ink drops of a material forming the convex portion 12 independently on the base coating region 11 without bringing the ink droplets into contact with each other. In this way, as shown in FIG. 7a-7f, a location of each of the convex portions with a hemisphere shape is changed, and various and elaborated designs can be expressed while ensuring antidazzling property. As shown in FIG. 7g, since the convex portion 12 has a substantially hemisphere shape on any cross section and the surface thereof is a rounded and smooth curved surface, the decorative surface structure 1 formed thereby can have excellent three-dimensional appearance and texture and a three-dimensional pattern matched with a drawing pattern.

Figure 9A:
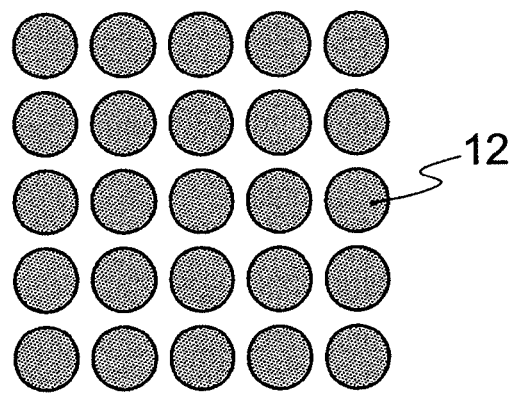
FIG. 9a is a top view of the convex portion of the decorative surface structure in the eighth embodiment of the present invention.
Figure 9B:
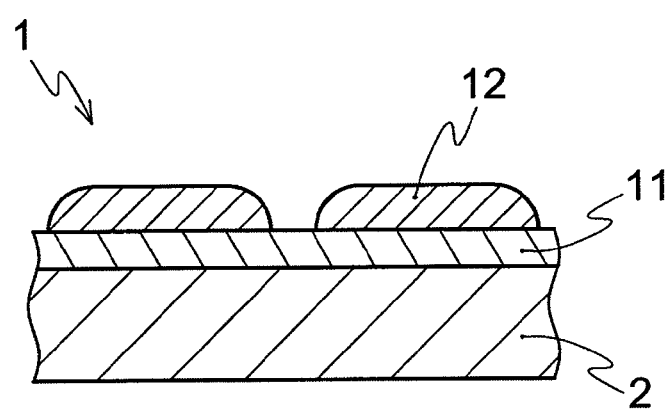
FIG. 9b is a cross sectional view of (a).
Figure 10:
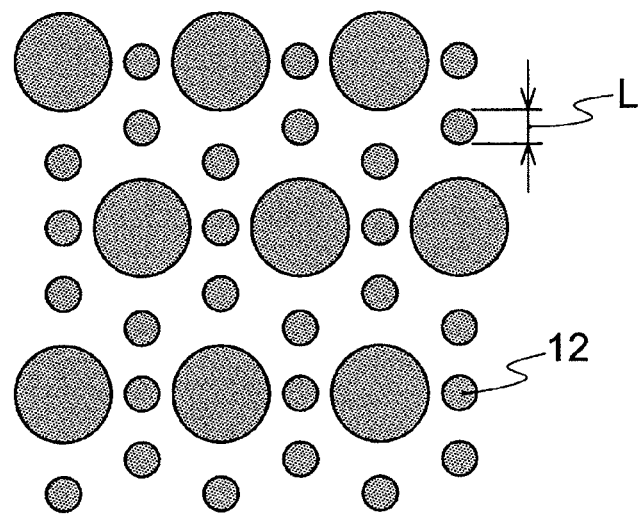
FIG. 10 is a top view of the convex portion of the decorative surface structure in the ninth embodiment of the present invention.
Figure 11A:
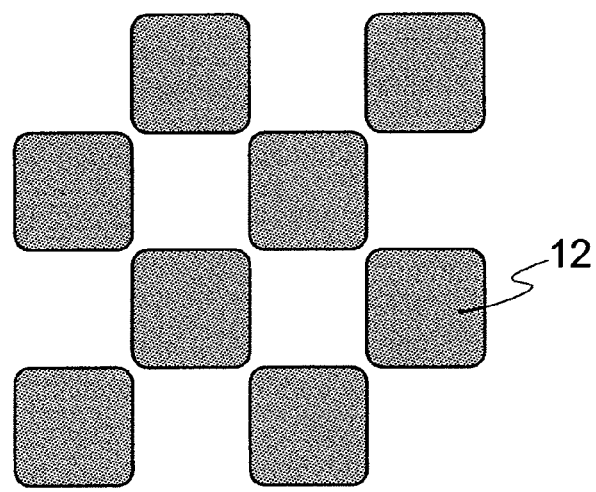
FIG. 11a is a top view of the convex portion of the decorative surface structure in the tenth embodiment of the present invention.
Figure 11B:
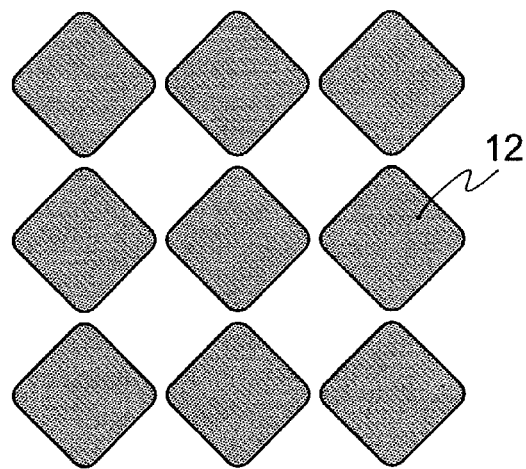
FIG. 11b is a top view of modification of (a).
Figure 12:
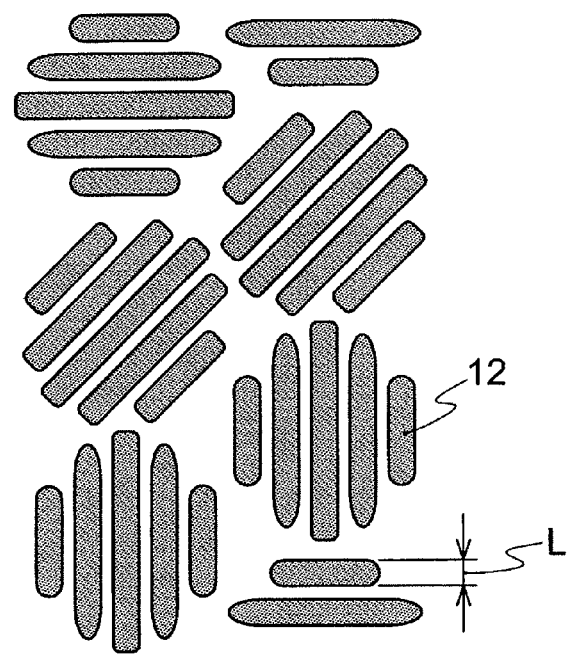
FIG. 12 is a top view of the convex portion of the decorative surface structure in the eleventh embodiment of the present invention.

The convex portion 12 has a curved surface in any cross sectional view, and a single convex portion 12 may be formed by applying a plurality of ink droplets. As shown in FIG. 8, shapes from top view of the convex portion 12 may be rectangular and rounded with long and short diameters. As shown in FIG. 9, the shape from top view of the convex portion 12 may be circular. As shown in FIG. 10, the circular size of the convex portion 12 can be optionally changed. As shown in FIG. 11, a shape from top view of the convex portion 12 may be a square with rounded corners. As shown in FIG. 12, each of a plurality of convex portions has various shapes and the convex portion 12 can be formed on the base coating region 11 in combination with each of them. In such ways, variation of sizes, locations and applied area of the convex portion 12 and the like allow the decorative surface structure 1 to have excellent design representation, three-dimensional appearance and texture while ensuring antidazzling property, and also to have a three-dimensional pattern matched with a drawing pattern.

In the decorative surface structure 1, area covered by the convex portion 12 per unit area is 20 to 60%. The area covered by the convex portion 12 is preferably not less than 20%, more preferably not less than 23%, most preferably not less than 25% to visually recognize the convex portion 12. In view of contrast of concave and convex regions and antidazzling property by which a three-dimensional pattern and three-dimensional appearance are represented, the area covered by the convex portion 12 is preferably not more than 60%, more preferably not more than 50%, most preferably not more than 40%. The area covered by the convex portion 12 per unit area is simply referred to as an applied area ratio hereinafter.

The area covered by the convex portion 12 per unit area is an area covered by the convex portion in digitalized information of design, and is not an area covered by the convex portion to the whole surface of the molded article. That is, when one image is configured by a plurality of convex portions, it represents an area covered by the convex portion on a smallest repeated image.

In this way, the convex portion 12 is formed, and this allows the base coating region 11 to exist between the synthetic resin molded article 10 and the convex portion 12 and at least two of lamination boundary areas exist therebetween. Since these boundary surfaces allow the convex portion 12 to protect the base coating from light, heat and wear, the synthetic resin molded article 10 can have improved weather resistance, heat resistance and wear resistance. Additionally, this allows the decorative surface structure 1 to have excellent design such as three-dimensional appearance and gloss by coating. When not less than 2 coats are used on the base coating region 11 in combination, not less than 3 lamination boundary surfaces exist between the substrate 2 and the surface of the base coating region 11.

(Decorative Ink)

According to the present invention, the convex portion of which a decorative surface structure is composed is one obtained by curing the decorative ink applied on the base coating region. The decorative ink is cured to form a convex portion as it includes a resin composition. Since the resin composition is applied on the base coating region and then required to be cured with its convex shape being kept as it is, an UV curing resin which enables a cured convex portion to be obtained immediately by irradiating ultraviolet rays is preferred.

The advantages to use the UV curing resin are such that a three-dimensional pattern can be formed by curing a component of decorative ink completely, and antidazzling property is secured by forming the convex portion and then reflecting incident light diffusely. Thus, even if a decorative ink does not include a pigment, a design can be represented only with a concavo-convex pattern formed by the base coating region and the convex shape. That is, even if a three-dimensional pattern to be obtained is clear, an excellent design for a three-dimensional appearance which can not be obtained only by a colored pattern can be represented by a difference in gloss and unevenness of a height between the convex portion with the decorative ink and the base coating region without the decorative ink.

(UV Curing Ink)

An UV curing ink mainly comprises a reactive monomer, a reactive oligomer and a photopolymerization initiator, and if necessary, additives such as a sensitizer for promoting initiation reaction of the photopolymerization initiator, a dispersant, a thermal stabilizer, an antioxidant, a preservative, a pH adjuster, an anti-foam agent, a penetrating agent and the like are added.

When applying UV curing ink by an ink jet method, the viscosity of the UV curing ink is preferably not more than 100 mPa·s at 25° C. in order to retain flowability of a feed system to a printer head (an ink flow channel such a tube and a pipe), more preferably 1 to 15 mPa·s at 60° C.±1° C. in view of discharging of ink jet.

The surface tension at discharging of the UV curing ink is preferably 20 to 40 dyne/cm, more preferably 25 to 35 dyne/cm in view of application to various base coatings. Furthermore, the surface tension is preferably not less than 20 dyne/cm in that bleeding on an image is prevented by reducing wettability and ink is fed to the printer head in a simple manner. In the case where the wettability is reduced, lines appear on the image due to repelling of ink. To prevent the lines, the surface tension is preferably not more than 40 dyne/cm.

(Reactive Monomer)

Examples of reactive monomers include hexa-functional acrylates such as dipentaerythritol hexaacrylate and a modified compound thereof; penta-functional acrylate such as dipentaerythritolhydroxy pentaacrylate; tetra-functional acrylates such as pentaditrimethylolpropan tetraacrylate, ethoxylated pentaerythritol tetraacrylate, and pentaerythritol tetraacrylate; tri-functional acrylates such as trimethylolpropane triacrylate, ethylene oxide-modified trimethylolpropane triacrylate, pentaerythritol triacrylate, tris(2-hydroxyethyl) isocyanurate triacrylate, and propoxylated glyceryl triacrylate; di-functional acrylates such as hydroxyl pivalate neopentyl glycol diacrylate, caprolactone-modified hydroxy pivalate neopentyl glycol diacrylate, polytetramethylene glycol diacrylate, trimethylolpropane acrylate benzoic acid ester, diethylene glycol diacrylate, triethylene glycol diacrylate, tetraethylene glycol diacrylate, polyethylene glycol (200) diacrylate, polyethylene glycol (400) diacrylate, polyethylene glycol (600) diacrylate, neopentyl glycol diacrylate, 1,3-butanediol diacrylate, 1,4-butanediol diacrylate, 1,6-hexanediol diacrylate, 1,9-nonanediol diacrylate, dimethylol tricyclodecane diacrylate, and bisphenol A ethylene oxide adduct diacrylate; and monofunctional acrylates such as caprolactone acrylate, tridecyl acrylate, isodecyl acrylate, isooctyl acrylate, isomyristyl acrylate, isostearyl acrylate, 2-ethylhexyl-diglycol acrylate, 2-hydroxy butyl acrylate, 2-acryloyloxy ethyl hexahydrophtalate, neopentyl glycol acrylate benzoic acid ester, isoamyl acrylate, lauryl acrylate, stearyl acrylate, butoxy ethyl acrylate, ethoxy-diethyleneglycol acrylate, methoxy-triethyleneglycol acrylate, methoxypolyethyleneglycol acrylate, methoxy dipropylene glycol acrylate, phenoxy ethyl acrylate, phenoxy-polyethylene glycol acrylate, nonylphenol ethylene oxide adduct acrylate, tetrahydro furfuryl acrylate, isobornyl acrylate, 2-hydroxyethyl acrylate, 2-hydroxypropyl acrylate, 2-hydroxy-3-phenoxy propyl acrylate, 2-acryloyloxyethyl-succinate, 2-acryloyloxyethyl-phthalate, and 2-acryloyloxyethyl-2-hydroxyethyl-phthalate. Further, other examples include reactive diluents which are obtained by combining a functional group such as phosphorus or fluorine with these monomers. These reactive diluents can be used independently or in combination. Of them, di-functional monomers are preferred in that the formed convex portion has excellent wear resistance and flexibility and 1,6-hexanediol diacrylate is preferred in that the formed convex portion has excellent transparency.

Tg of the reactive monomer is preferably not less than 20° C. in view of reducing surface stickiness after curing, and the viscosity at 25° C. is preferably not more than 30 mPa·s in view of discharging of ink droplets.

The reactive monomer is included preferably in an amount of 65 to 95% by weight in the UV curing ink. The reactive diluent is included preferably in an amount of not less than 65% by weight, more preferably not less than 70% by weight in order to retain good discharging property, and preferably not more than 95% by weight, more preferably not more than 75% by weight in order to mix other agents required for curing.

(Reactive Oligomer)

Examples of reactive oligomers include urethane acrylate, polyester acrylate, epoxy acrylate, silicon acrylate and polybutadiene acrylate, and they can be used independently or in combination. Of them, the urethane acrylate is preferred for excellent adhesiveness.

The reactive oligomer is included preferably in an amount of 1 to 30% by weight, more preferably 15 to 25% by weight in the ink in order to maintain high wear resistance, flexibility and adhesiveness of the formed convex portion.

(Photopolymerization Initiator)

Examples of photopolymerization initiators include those based on benzoin, thioxanthone, benzophenone, ketal and acetophenone and they can be used independently or in combination. Of them, hydroxyketones and acylphosphine oxides are preferred in that they are highly reactive and of hard-yellowing type.

An adding amount of photopolymerization initiator is preferably 1 to 10% by weight, more preferably 3 to 7% by weight in view of polymerization, curing ratio, curing speed and the cost.

(Color Materials)

To express colorful design representations, the decorative ink includes color materials. This allows the decorative surface structure to have a three-dimensional pattern in which a concavo-convex pattern is matched with a colored drawing pattern, and variation of color tones which is not obtained in a flat pattern, and contrasts of shading beyond those of an actual three-dimensional pattern by combining with a concavo-convex pattern can be represented by shading of this three-dimensional pattern.

According to the present invention, pigments, dyes or the like can be used as a color material, and pigments having excellent weather resistance and light fastness are preferably used. Organic and inorganic pigments can be used.

Examples of organic pigments include nitrosos, dye lakes, azo lakes, insoluble azos, monoazos, disazos, condensed azos, benzoimidazolones, phthalocyanines, anthraquinones, perylenes, quinacridones, dioxazines, isoindolines, azomethines, and pyrrolopyrroles.

Examples of inorganic pigments include oxides, hydroxides, sulfides, ferrocyanides, chromates, carbonates, silicates, phosphates, carbons (carbon black), and metallic powders.

Examples of dyes include oil-soluble dyes such as azos, anthraquinones, indigoids, phthalocyanines, carboniums, quinoneimines, methines, xanthenes, nitros and nitrosos, disperse dyes, acid dyes, reactive dyes, cationic dyes and direct dyes.

Contents of color materials in the decorative ink are preferably 0 to 10% by weight, more preferably 0.01 to 2% by weight in view of required enough coloring, discharge of ink and the cost.

(Dispersant)

If necessary, a dispersant is added to the decorative ink of the present invention. Examples of dispersants include anionic compounds, cationic compounds, nonionic compounds, amphoteric compounds and polymer compounds, and can be used independently or in combination. Of them, highly dispersable polymer type is preferred and one having an acidic adsorbed group or a basic adsorbed group at its end is more preferred.

An adding amount of the dispersant in the decorative ink is determined optionally by types of color materials to be dispersed and is preferably 0 to 150% by weight, more preferably 10 to 60% by weight to color materials in view of a dispersing effect, discharging of decorative ink and the cost.

If necessary, addictives such as a sensitizer for promoting initiation reaction of photopolymerization initiator in addition to a thermal stabilizer, an antioxidant, a preservative, an anti-foam agent, a penetrating agent, resin binder, resin emulsion, anti-reducing agent, leveling agent, pH adjuster, pigment derivatives, polymerization inhibitor, ultraviolet absorber, light stabilizer and the like can be added.

(Preparation of Decorative Surface Structure)

Preferably, the decorative ink comprising the above components is dispersed by dispersers such as a roll mill, a ball mill, colloid mill, jet mill and bead mill. Subsequently, the resultant is filtered to remove bulk particles from ink.

The decorative ink is applied on the base coating region as a substrate by conventional printing method such as a letterpress printing, planographic printing, intaglio printing, stensil printing and ink jet printing. Particularly, ink jet printing is preferred, since it is not required to use a template and is capable of forming an elaborated design representation and a three-dimensional pattern.

The ink jet method used in the present invention is not limited particularly, and there can be used continuous methods such as a charge modulated type, a micro dot type, a charged spraying control type and an ink mist type; and on-demand method such as stemme type, pulse jet type, bubble jet (registered trade name), electrostatic attraction type and the like.

Preferably, the convex portion is formed by dropping a plurality of ink droplets of the decorative ink on the base coating region to apply in the amount of 20 to 100 g/m$^2$ in total, and after a certain period, irradiating the UV curing ink with ultraviolet rays from an ultraviolet lamp mounted on both sides of a carriage to cure the ink. These steps are repeated 2 to 8 times to form the convex portion.

One droplet of the decorative ink is preferably 60 to 140 pg. The amount of droplets is preferably not less than 60 pg, more preferably not less than 90 pg in view of forming the convex portion having the height which is 2 to 20 times the thickness of the base coating region at predetermined cycles of application (about 2 to 8 cycles). Although use of a printer head with a plurality of nozzles can provide increased amount of droplets, a large-sized carriage of the printer is required, and power consumption is increased. In view of the cost, the amount of droplet is preferably not more than 140 pg, more preferably not more than 130 pg.

An applied amount of the decorative ink on the base coating region is preferably not less than 20 g/m$^2$, more preferably not less than 100 g/m$^2$ so as to observe coloring and a three-dimensional pattern visually and the convex portion tactually. In view of prevention of poor ink curing, the applied amount of the ink is preferably not more than 200 g/m$^2$, more preferably not more than 170 g/m$^2$.

In the case where the decorative ink is an UV curing ink, it is preferable that a head of common ink jet printer is equipped with a heating unit and heated at 25 to 150° C. to decrease the viscosity of the ink for discharging of the ink. The heating temperature is more preferably within the range of 40 to 70° C. The heating temperature is determined depending on curing property to heat of the used reactive oligomer, and preferably set lower than the temperature in which curing begins by heat.

The UV curing ink applied on the base coating region is cured by irradiating with ultraviolet rays from an ultraviolet lamp mounted on both sides of the carriage. In view of the curing property of UV curing ink and prevention of deterioration of a resin contained in the base coating region by ultraviolet energy and of deformation of a substrate by excessive heat generated by the energy, an output of the ultraviolet lamp is preferably 50 to 280 W/cm, more preferably 60 to 180 W/cm.

In view of prevention of deterioration of a resin contained in the coating for the base coating by irradiation energy and of deformation of the substrate by excessive heat generated by the energy, 0.1 to 1.0 second ultraviolet irradiation is preferably repeated 10 to 30 times, more preferably 15 to 20 times.

According to the embodiment of the present invention, in the case where a three-dimensional pattern is formed on the synthetic resin molded article which is used as a part fixed on automobile body such as a door trim, the molded article is preferably printed while being set on a jig which is capable of fixing the molded article horizontally. That is, in the case where the molded article cannot be fixed horizontally, it is hard to keep a certain accuracy of drop placement of the ink droplet discharged from the head of the ink jet, and therefore the quality of printing is decreased. In this case, printing is preferably conducted while covering the non-printing region by masking or the like depending on a shape of the molded article. That is, in the case where there are the ink stains on a region to be incorporated inside the automobile body, poor assembly of the part to the automobile body and poor implement such as an abnormal noise or the like can be conducted.

Since application of the decorative ink can be optionally conducted on the desired area in which the convex portion is formed using an image processing software, various three-dimensional patterns can be formed on synthetic resin molded articles with identical shapes as well as with various shapes. Additionally, since ink application conditions such as the amount of ink droplets and applied amount of ink, UV curing conditions and ink application sites can be optionally controlled, various conditions such as single size, shapes, height and ink application area of the convex portion can be optionally set. Thus, the decorative surface structure with elaborated and excellent texture can be formed on surfaces of synthetic resin molded articles.

EXAMPLE

The present invention is then explained by means of examples, but is not limited thereto.

Example 1

| [Preparation of a pigment paste] | |
|---|---|
| IRGALITE BLUE GLNF (copper phthalocyanine pigment available from Ciba Specialty Chemicals Inc.) | 30 parts by weight |
| Flowlen DOPA-33 (dispersant, modified acryl-based copolymer available from KYOEISHA CHEMICAL CO., LTD) | 3 parts by weight |
| ACRYDIC WXU-880 (acrylic resin available from DIC corporation) | 60 parts by weight |
| Methyl isobutyl ketone | 30 parts by weight |
| Xylene | 15 parts by weight |

Each of the above components was mixed by a mixer, and then the mixture was dispersed for 3 hours by a bead mill to prepare a pigment paste.

[Preparation of a Color Base Coat]

Fifty parts by weight of the pigment paste prepared above, 180 parts by weight of acrylic resin for coating (Trade name: ACRYDIC WXU-880 available from DIC Corporation), 120 parts by weight of methyl isobutyl ketone, 70 parts by weight of xylene, 70 parts by weight of butyl acetate and 70 parts by weight of toluene were mixed until it was fully homogeneous and subsequently, to the mixture was added 5 parts by weight of polyisocyanate prepolymer (Trade name: BURNOCK DN-980 available from DIC Corporation). The resultant was filtered to remove impurities and a color base coat was prepared.

15

[Colored Base Coating Region]

A substrate of an ABS molded article with a length of 100 mm, a width of 100 mm and a thickness of 3 mm was prepared, and the surface of the substrate was washed with isopropanol and then the substrate of ABS molded article was dried. Subsequently, the color base coat was applied on the dried substrate by a spray gun (Trade name: W-101 available from ANEST IWATA Corporation) so as to have a thickness of 30 μm and then the applied substrate was dried with hot air at 70° C. for 30 min.

| [Preparation of the decorative ink A] | |
|---|---|
| IRGALITE BLUE GLNF (copper phthalocyanine pigment available from Ciba Specialty Chemicals Inc.) | 2 parts by weight |
| Flowlen DOPA-33 (dispersant, modified acryl-based copolymer available from KYOEISHA CHEMICAL CO., LTD) | 1 part by weight |
| CN983 (Urethane acrylate oligomer available from Sartomer Japan Inc.) | 20 parts by weight |
| SR238F (1,6-hexanediol diacrylate available from Sartomer Japan Inc., Tg: 43° C.) | 72 parts by weight |
| IRGACURE184 (1-hydroxy-cyclohexyl-phenyl-ketone available from Ciba Specialty Chemicals Inc.) | 5 parts by weight |

Each of the above components was mixed by a mixer and then the mixture was dispersed for 3 hours by a bead mill. The resultant was filtered to remove impurities and thus the decorative ink A was prepared.

The obtained decorative ink A was printed on the base coating region of the substrate of ABS molded article by an ink jet printer under the following conditions. Subsequently, ultraviolet ray was irradiated by an ultraviolet lamp under the following conditions and the irradiated ink was cured to obtain the printed region. Conditions of evaluated pattern are indicated below.

[Evaluated Pattern]
A) drawing pattern: vertical 0.6 mm wide strips at an interval of 1.1 mm
B) Area ratio covered by the convex portion: 33%
C) Height of the convex portion: 90 μm

[Printing Conditions]
a) Heating temperature of printer head: 60 (° C.)
b) Diameter of nozzle: 70 (μm)
c) Applied voltage: 50 (V)
d) Pulse width: 15 (μs)
e) Driving frequency: 4.5 (kHz)
f) Repeated printing cycle: 4
g) Amount of single ink droplet: 110 pg
h) Applied amount of ink in total: 100 (g/m$^2$)

[Conditions of Ultraviolet Irradiation]
i) Type of lamp: metal halide lamp
ii) Voltage: 120 W/cm
iii) Irradiation cycle: 20
iv) Height of irradiation: 5 (mm)

Example 2

According to the same method as Example 1 except that in the printing conditions, repeated printing cycle was 1 (applied amount of ink in total: 25 g/m$^2$), the decorative ink A was printed on the base coating region of the substrate for ABS molded article and then the ink was cured to obtain the printed region. In evaluated pattern of the obtained printed region, the height of convex portion was 30

The obtained printed region was evaluated according to the following evaluation methods. The results are shown in Table 1.

[Evaluation Methods]
(1) Three-Dimensional Appearance
Twenty persons evaluated the printed region visually.

| Criteria: | visible three-dimensionally | 2 |
|---|---|---|
| | visible slightly three-dimensionally | 1 |
| | not visible three-dimensionally | 0 |

The average score of 1.5 or more is represented as ○, and one under 1.5 is represented as x. The results are shown in Table 1.

(2) Texture
Twenty persons evaluated the printed region tactually

| Criteria: | touchable concavo-convex shapes | 2 |
|---|---|---|
| | touchable concavo-convex shapes slightly | 1 |
| | not touchable concavo-convex shapes | 0 |

The average score over 1.5 is represented as ○, and one under 1.5 is represented as x. The results are shown in Table 1.

(3) Adhesiveness
Grid-like cuts were made on the produced samples using a blade knife until depth of the cuts reached the substrate, wherein 11 cuts were made at 2 mm interval horizontally and vertically, and 100 grids per sample were prepared. Subsequently, an adhesive tape was attached on the whole surface of sample, followed by separating quickly from the surface. The separated surface was visually observed. The results obtained in Examples 1 and 2 are shown in Table 1.
○ not observed detachments of the colored base coating region and the convex portion.
x observed detachments of the colored base coating region and the convex portion.

(4) Wear Resistance
Test for wear resistance was conducted with Gakushin-type fastness to rubbing tester by placing a dried cloth plus 5 gauzes on the sample surface under the conditions of 100 mm of stroke width, 49 kPa of pressure and 200 cycles. Subsequently, the sample surface was visually observed. The results obtained in Examples 1 and 2 are shown in Table 1.
○ not observed detachments or significant scratches of the colored base coating region and the convex portion.
x observed detachments or significant scratches of the colored base coating region and the convex portion.

TABLE 1

| | Ex. | |
|---|---|---|
| | 1 | 2 |
| Three-dimensional appearance | ○ | X |
| Texture | ○ | X |
| Adhesiveness | ○ | ○ |
| Wear resistance | ○ | X |

As shown in Table 1, it is found that the decorative surface structure of Example 1, which is formed on the substrate of ABS molded article, is formed by over-applying the convex portion and has excellent three-dimensional appearance and texture, as well as good adhesiveness and wear resistance as compared with Example 2.

Example 3

[Preparation of a Pigment Paste]
The same method as Example 1 was conducted.
[Preparation of a Color Base Coat]
The same method as Example 1 was conducted.
[Colored Base Coating Region]
The same method as Example 1 was conducted except that the coat was applied so as to have a dried layer thickness of 20 μm.
[Preparation of a Decorative Ink B]
Seventy five parts by weight of reactive monomer (Trade name: SR238F, 1,6-hexanediol diacrylate, di-functional acrylate, available from Sartomer Japan Inc.), 5 parts by weight of photopolymerization initiator (Trade name: IRGACURE184, 1-hydroxy-cyclohexyl-phenyl-ketone available from Ciba Specialty Chemicals Inc.) and 20 parts by weight of reactive oligomer (Trade name: CN983, urethane acrylate oligomer available from Sartomer Japan Inc.) were mixed and the mixture was dispersed using a bead mill disperser. Subsequently, the resultant was filtered to remove impurities and the decorative ink B was prepared.

The obtained decorative ink B was printed on a base coating region of the ABS substrate by an ink jet printer under the following conditions. Subsequently, ultraviolet ray was irradiated by an ultraviolet lamp under the following conditions and the irradiated ink was cured to obtain the printed region. Conditions of evaluated pattern are indicated below and in Table 2.

[Evaluated Pattern]
 A) Drawing pattern: mono and solid color
 B) Type of convex portion: dot
 C) Diameter of convex portion: 0.3 mm
 D) Height of convex portion: 100 μm
 E) Arrangement of convex portion: arrangement at 0.45 mm-pitch horizontally and vertically
 F) Area ratio covered by convex portion: 35%

[Printing Conditions]
 a) Diameter of a nozzle: 70 (μm)
 b) Applied voltage: 50 (V)
 c) Pulse width: 20 (μs)
 d) Driving frequency: 3 (kHz)
 e) Resolution: 180 (dpi)
 a) Heating temperature: 60 (° C.)
 f) Repeated printing cycle: 4
 g) Amount of single ink droplet: 110 pg
 h) Applied amount of ink in total: 40 (g/m$^2$)
[Conditions of Ultraviolet Irradiation]
 i) Type of lamp: metal halide lamp
 ii) Voltage: 120 W/cm
 iii) Irradiation time: 1 (sec)
 iv) Irradiation cycle: 20
 v) Height of irradiation: 10 (mm)

The cross section of the sample prepared under the above conditions was imaged at 200 folds magnification of a microscope and observed. Consequently, it was found that a colored coating region with a thickness of 20 μm and a convex portion with a diameter of 0.3 mm and a height of 100 μm were formed on the ABS substrate. Applied area ratio of the convex portion was imaged by a digital camera from top view of ABS substrate and as a result of image analysis, it was found that the area ratio was 35%.

Example 4

[Preparation of the Decorative Ink C]
Three parts by weight of Sicopal Yellow L1100 (C.I. Pigment Yellow 184, bismuth vanadate available from BASF Japan Ltd.) as a inorganic pigment, 3 parts by weight of dispersant (polymer compound, Trade name: Disperbyk-168 available from BykChemie), 69 parts by weight of reactive monomer (Trade name: SR238F, 1,6-hexanediol diacrylate, di-functional acrylate available from Sartomer Japan Inc.), 5 parts by weight of photopolymerization initiator (Trade name: IRGACURE184, 1-hydroxy-cyclohexyl-phenyl-ketone available from Ciba Specialty Chemicals Inc.) and 20 parts by weight of reactive oligomer (Trade name: CN983, urethane acrylate oligomer available from Sartomer Japan Inc.) were mixed and the mixture was dispersed by a bead mill disperser. Subsequently, the resultant was filtered to remove impurities. The decorative ink C was prepared.

The obtained decorative ink C was printed on a base coating region of the ABS substrate by an ink jet printer under the same conditions as Example 2 and the ink was cured to obtain the printed region. Conditions of evaluated pattern are indicated in Table 2.

Examples 5 to 10

According to the same method as Example 2 except that conditions of evaluated pattern were changed as shown in Table 2, the decorative ink was printed on the substrate and then the ink was cured to obtain the printed region. Conditions of evaluated pattern are indicated in Table 2.

TABLE 2

| | Ex. | | | | | | | |
|---|---|---|---|---|---|---|---|---|
| | 3 | 4 | 5 | 6 | 7 | 8 | 9 | 10 |
| Diameter of convex portion (mm) | 0.3 | 0.3 | 0.1 | 5.0 | 0.3 | 0.3 | 0.3 | 0.3 |
| Height of convex portion (μm) | 100 | 100 | 100 | 100 | 10 | 250 | 100 | 100 |
| Area ratio covered by convex portion (%) | 35 | 35 | 35 | 35 | 35 | 35 | 10 | 80 |

Comparative Example 1

The colored base coating was applied according to the same method as Example 3 and dried. Subsequently, the resultant base coating region was subjected to indentation molding to form a plurality of line-like fine concave patterns, and thus a printed region subjected to matting treatment was obtained. Concave portions of a fine concave pattern had a short diameter of 0.5 mm, a depth of 50 μm and an area ratio covered by whole concave region of 60%.

The obtained printed region was evaluated according to the following evaluation methods. The results are shown in Table 3.

[Evaluation Method]
(1) Three-Dimensional Appearance
Twenty in-house persons who drive daily evaluated the printed region obtained in Examples 3 to 10 and Comparative Example 1 comparatively.

| Criteria: | visible three-dimensionally | 2 |
|---|---|---|
|  | visible slightly three-dimensionally | 1 |
|  | not visible three-dimensionally | 0 |

The average of the results of evaluation by 20 persons is shown in Table 3.

(2) Elaborateness of Image Representation
Twenty in-house persons evaluated the printed region obtained in Examples 3 to 10 and Comparative Example 1 comparatively.

| Criteria: | Elaborated | 2 |
|---|---|---|
|  | Slightly elaborated | 1 |
|  | Not elaborated | 0 |

The average of the results of evaluation by 20 persons is shown in Table 3.

(3) Gloss
Twenty in-house persons evaluated the printed region obtained in Examples 3 to 10 and Comparative Example 1 comparatively.

| Criteria: | Strong gloss | 2 |
|---|---|---|
|  | Slight gloss | 1 |
|  | No gloss | 0 |

The average of the results of evaluation by 20 persons is shown in Table 3.

(4) Antidazzling Property
When sunlight is directed outdoors onto the printed regions obtained in Examples 3 to 10 and Comparative Example 1, whether or not twenty in-house persons feel dazzling at a distance of 50 cm was evaluated comparatively.

| Criteria: | No dazzling | 2 |
|---|---|---|
|  | Slightly dazzling | 1 |
|  | Dazzling | 0 |

The average of the results of evaluation by 20 persons is shown in Table 3.

(5) Durability
The printed regions obtained in Examples 3 to 10 and Comparative Example 1 were subjected to abrasion at a load of 2,500 g/cm$^2$ by using a planar abrasion shaft with gauzes of planar abrasion apparatus. When the number of cycles, in which breakage or deficit of the convex portion is generated, is 20 or more, it is represented as ○, and when the number of cycles is under 20, it is represented as x.

TABLE 3

|  | Ex. | | | | | | | | Com. Ex. |
|---|---|---|---|---|---|---|---|---|---|
|  | 3 | 4 | 5 | 6 | 7 | 8 | 9 | 10 | 1 |
| Three-dimensional appearance | 2.0 | 2.0 | 0.6 | 2.0 | 0.1 | 2.0 | 0.7 | 0.8 | 1.8 |
| Elaborateness of image representation | 2.0 | 2.0 | 2.0 | 0.7 | 2.0 | 2.0 | 2.0 | 2.0 | 0.4 |
| Gloss | 2.0 | 2.0 | 0.3 | 2.0 | 1.8 | 2.0 | 1.0 | 2.0 | 0.1 |
| Antidazzling property | 2.0 | 2.0 | 2.0 | 0.8 | 2.0 | 2.0 | 2.0 | 0.0 | 2.0 |
| Durability | ○ | ○ | ○ | ○ | ○ | X | ○ | ○ | ○ |

As shown in Table 3, it is found that as a diameter of the convex portion formed on the ABS substrate is too small (Example 5), the qualities of three-dimensional appearance and gloss are decreased, and as a diameter of the convex portion formed on the ABS substrate is too large (Example 6), the qualities of elaboratedness of image representation and antidazzling property are decreased. Furthermore, it is found that as a height of the convex portion from the surface of the base coating region is too low (Example 7), the quality of three-dimensional appearance is decreased and as the height is too high (Example 8), the durability is decreased. It is found that as the applied area ratio of the convex portion on the substrate is too low (Example 9), the qualities of three-dimensional appearance and gloss are decreased and as the applied area ratio is too high (Example 10), the qualities of three-dimensional appearance and antidazzling property are decreased. It is found that those, in which a plurality of line-like fine concave patterns are formed on the colored base coating region of the substrate, have poor elaborated image representation and gloss.

Examples 11 to 25

According to the same method as Example 2 except that conditions of evaluated pattern were changed as shown in Table 4, respectively, the decorative ink was printed on the substrate and then the ink was cured to obtain the printed region. Conditions of evaluated pattern are indicated in Table 4.

TABLE 4

|  | Ex. | | | | | | | | | | | | | | |
|---|---|---|---|---|---|---|---|---|---|---|---|---|---|---|---|
|  | 11 | 12 | 13 | 14 | 15 | 16 | 17 | 18 | 19 | 20 | 21 | 22 | 23 | 24 | 25 |
| Decorative ink | B | B | B | B | B | B | B | B | B | B | B | B | B | B | B |
| Thickness of coating layer | 20 | 20 | 20 | 20 | 20 | 20 | 20 | 20 | 20 | 20 | 20 | 20 | 20 | 20 | 20 |
| Height of convex portion | 30 | 100 | 180 | 240 | 400 | 30 | 30 | 30 | 100 | 100 | 100 | 100 | 100 | 100 | 100 |
| Area ratio covered by convex portion | 40 | 40 | 40 | 40 | 40 | 3 | 10 | 70 | 3 | 10 | 70 | 3 | 10 | 40 | 70 |
| Diameter of convex portion | 0.3 | 0.3 | 0.3 | 0.3 | 0.3 | 0.3 | 0.3 | 0.3 | 0.3 | 0.3 | 0.3 | 0.1 | 0.1 | 0.1 | 0.1 |
| Three-dimensional appearance | 0.8 | 1.5 | 1.8 | 2 | 2 | 0.4 | 0.4 | 0.5 | 0.8 | 1.1 | 0.5 | 0.7 | 0.8 | 1 | 0.7 |
| Elaborateness of image representation | 1 | 1.8 | 2 | 2 | 2 | 0.7 | 0.8 | 0.7 | 1.4 | 1.5 | 0.8 | 1.5 | 1.8 | 1.7 | 1 |
| Gloss | 1.3 | 1.4 | 1.4 | 1.5 | 1.6 | 1.7 | 1.5 | 1.1 | 1.8 | 1.7 | 1.4 | 1.8 | 1.6 | 1.5 | 1.2 |

TABLE 4-continued

| | Ex. | | | | | | | | | | | | | | |
|---|---|---|---|---|---|---|---|---|---|---|---|---|---|---|---|
| | 11 | 12 | 13 | 14 | 15 | 16 | 17 | 18 | 19 | 20 | 21 | 22 | 23 | 24 | 25 |
| Antidazzling property | 1.9 | 1.9 | 1.8 | 1.8 | 1.7 | 1.2 | 1.9 | 1.1 | 1.2 | 1.7 | 1 | 1.2 | 1.5 | 1.8 | 1.3 |
| Durability | ○ | ○ | Δ | Δ | Δ | ○ | ○ | ○ | ○ | ○ | ○ | ○ | ○ | ○ | ○ |

EXPLANATION OF SYMBOLS

1 Decorative surface structure
2 Substrate
10 Synthetic resin article
11, 11a, 11b Base coating region
12 Convex portion
13a-d Ink layers
14 Finish coating region
L Short diameter (diameter) (of convex portion)

The invention claimed is:

1. A decorative surface structure comprising:
   a base coating formed on a surface of a synthetic resin molded article; and
   at least one convex portion,
   wherein each of the at least one convex portion is composed of a plurality of cured ink layers, formed only on the surface of the base coating, said plurality of cured ink layers comprising a decorative ink,
   wherein said decorative ink, comprising a resin composition, is an ultraviolet curing ink and includes a color material, and
   wherein the base coating has a thickness of at least 20 μm and not more than 30 μm.

2. The decorative surface structure according to claim 1, wherein the area covered by the at least one convex portion per unit area is 20 to 60%.

3. The decorative surface structure according to claim 2, wherein a diameter of the convex portions is 0.2 to 2.0 mm and a height of the at least one convex portion from the base coating is 20 to 200 μm.

4. The decorative surface structure according to claim 2, wherein the decorative ink has a hemispherical shape and a diameter thereof is 0.2 to 1.0 mm.

5. The decorative surface structure according to claim 1, wherein the height of the at least one convex portion from the base coating is 2 to 20 times the thickness of the base coating.

6. The decorative surface structure according to claim 1, wherein a height of the at least one convex portion from the base coating is at most 150 μm.

* * * * *